Jan. 15, 1963 F. M. POTTER 3,074,002
DYNAMOELECTRIC MACHINE
Filed Sept. 29, 1958
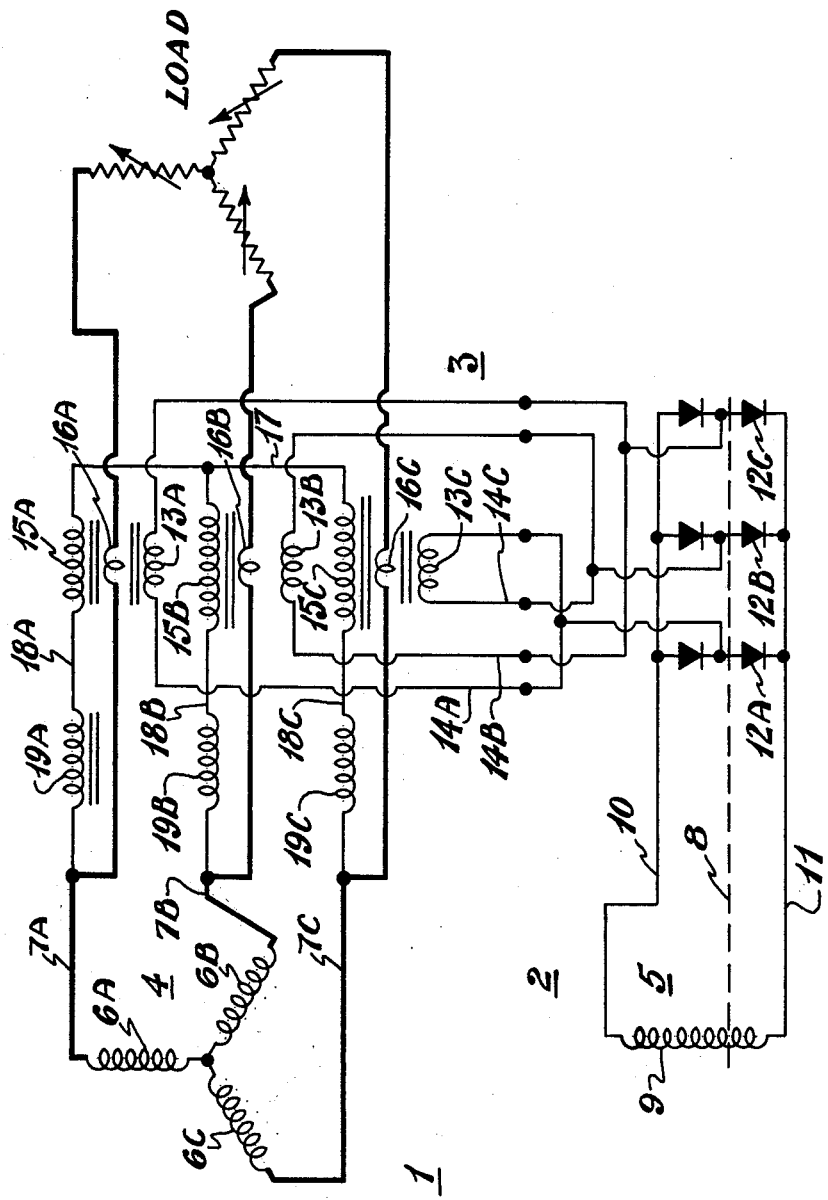
INVENTOR.
FREDERICK M. POTTER
BY
ATTORNEY "# United States Patent Office 3,074,002
Patented Jan. 15, 1963

3,074,002
DYNAMOELECTRIC MACHINE
Frederick M. Potter, Westwood, N.J., assignor to The
Bendix Corporation, a corporation of Delaware
Filed Sept. 29, 1958, Ser. No. 764,086
2 Claims. (Cl. 322—25)

The present invention relates to dynamoelectric machines and more particularly to a self-regulating dynamoelectric machine.

In some applications it is necessary to have an A.C. generator that has self-regulating characteristics. Heretofore, permanent magnet types have been used, however, the output voltage of such a machine varies with load.

The present invention provides a novel brushless A.C. generator which operates without a voltage regulator and is so constructed to provide good self-regulating characteristics. The excitation is in proportion to the load and power factor and is substantially the amount required by the generator.

It is an object of the invention to provide an improved dynamoelectric machine.

Another object of the invention is to provide a novel brushless self-regulating A.C. generator.

Another object of the invention is to provide a novel dynamoelectric machine which will be competitive with permanent magnet type machines.

Another object of the invention is to provide a small, light weight generating system.

The above and other objects and features of the invention will appear more fully hereinafter from a consideration of the following description taken in connection with the accompanying drawing wherein one embodiment is illustrated by way of example.

In the drawing, the single FIGURE is a schematic drawing of a machine embodying the invention.

Referring now to the drawing, an A.C. generator is indicated generally by the numeral 1 and includes a main generator 2 and an exciter 3. The main generator 2 has a stator 4 and rotor 5. The stator 4 has a three phase winding 6A, 6B and 6C. Connected to output lines 7A, 7B and 7C respectively. The stator laminations are of a material which saturates abruptly, for example, a nickel iron alloy (Allegheny type 4750 or equivalent).

The rotor 5 is adapted to be driven from a prime mover (not shown) by a shaft indicated by dashed line 8. An excitation winding 9 is provided on the rotor 5 and is connected by conductors 10 and 11 to the output of rectifiers 12A, 12B and 12C which are mounted for rotation on the shaft 8 and rotating windings 13A, 13B and 13C of the exciter 3. The windings 13A, 13B and 13C are delta connected and the output therefrom connected to the rectifiers 12A, 12B and 12C by conductors 14A, 14B and 14C.

The exciter 3 has voltage windings 15A, 15B and 15C and current windings 16A, 16B and 16C wound on conventional A.C. stator laminations. The windings 15A, 15B and 15C have one end thereof connected together by a conductor 17 thus forming a star connection. The other ends are connected by conductors 18A, 18B and 18C and reactors 19A, 19B and 19C to the output conductors 7A, 7B and 7C respectively. The current windings 16A, 16B and 16C are connected in series with the output conductors 7A, 7B and 7C respectively.

The main generator or alternator is similar to the conventional salient pole, rotating field type. The excitation for the rotating field is supplied from the exciter which can be termed a rotating transformer. The rotor windings or secondaries are mounted on the shaft adjacent to the rotor of the main generator and connected thereto through rectifiers, which for example may be silicone diode types. The stator of the exciter is similar to a conventional laminated A.C. generator stator. It has the two windings, one of which is the voltage winding and the other a current winding. The voltage winding is connected to the terminals of the main generator through series linear reactors and the current winding is connected in series with the output of the main generator. By proper selection of the turns in the current winding and the amount of reactance in the linear reactor, proper phase addition can be obtained so that the output from the exciter secondary winding is in proportion to the power factor and the amount of the load. Thus, an excitation is provided that substantially equals the actual requirements of the main generator rotating field.

To maintain the voltage substantially constant, with changes in load and power factor, in addition to the above, the main generator stator laminations are of a material which saturates abruptly and the generator is designed so that at no load, the magnetic level is slightly above the knee of the saturation curve. Changes in the excitation with load, as heretofore described, will tend to increase the magnetic flux level very slightly due to the sharp saturation properties of the material. The inherent voltage drop with load due to the resistance and reactance of the stator windings will be substantially equal to any increase in the magnetic flux level, thus resulting in an extremely flat voltage characteristic for the machine.

Although only one embodiment of the invention has been illustrated and described, various changes in the form and relative arrangement of the parts, which will now appear to those skilled in the art, may be made without departing from the scope of the invention.

What is claimed is:
1. A self-regulating brushless A.C. generator comprising a main generator and an exciter, said main generator having a rotor and a stator, said stator being of a material which saturates abruptly, an excitation winding on said rotor, an output winding on said stator, said exciter having a rotor and a stator, a voltage winding and a current winding on said stator, an output winding on said rotor, means including rectifiers connecting said exciter output winding to said main generator excitation winding, means connecting said exciter current windings in series with said main generator output, and means including linear reactors connecting said voltage windings to said main generator output.
2. A self-regulating brushless A.C. generator comprising a main generator and an exciter, said main generator having a rotor and a stator, said stator having laminations of a material which saturates abruptly, a three phase output winding on said stator, an excitation winding on said rotor, said exciter having a rotor mounted for rotation with said main generator rotor and a stator, a three phase delta connected output winding on said exciter stator, means including rectifiers connecting said exciter output winding to said main generator excitation winding, current windings on said exciter stator connected in series with said main generator output, star connected voltage windings on said exciter stator, and means including linear reactors connecting said voltage windings to said main generator output.

References Cited in the file of this patent

UNITED STATES PATENTS

| | | |
|---|---|---|
| 1,736,618 | Nickle | Nov. 19, 1929 |
| 2,414,287 | Crever | Jan. 14, 1947 |
| 2,482,875 | Sawyer | Sept. 27, 1949 |
| 2,722,652 | Brainard | Nov. 1, 1955 |
| 2,836,786 | Scharstein et al. | Mar. 27, 1958 |
| 2,839,716 | Harz | June 17, 1958 |
| 2,848,680 | Maggs | Aug. 19, 1958 |
| 2,879,465 | Wood | Mar. 24, 1959 |
| 2,963,636 | Leroy | Dec. 6, 1960 |